(12) United States Patent
Seo et al.

(10) Patent No.: US 10,143,004 B2
(45) Date of Patent: Nov. 27, 2018

(54) METHOD AND APPARATUS FOR RECEIVING ABS INFORMATION IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 15/102,385

(22) PCT Filed: Dec. 18, 2014

(86) PCT No.: PCT/KR2014/012529
§ 371 (c)(1),
(2) Date: Jun. 7, 2016

(87) PCT Pub. No.: WO2015/093869
PCT Pub. Date: Jun. 25, 2015

(65) Prior Publication Data
US 2016/0309502 A1    Oct. 20, 2016

Related U.S. Application Data

(60) Provisional application No. 61/917,909, filed on Dec. 18, 2013.

(51) Int. Cl.
*H04W 72/12* (2009.01)
*H04W 16/10* (2009.01)
(Continued)

(52) U.S. Cl.
CPC ....... *H04W 72/1278* (2013.01); *H04L 1/1812* (2013.01); *H04L 1/1861* (2013.01);
(Continued)

(58) Field of Classification Search
CPC ............ H04W 72/1278; H04W 16/10; H04W 52/38; H04W 84/045; H04W 92/20;
(Continued)

(56) References Cited

U.S. PATENT DOCUMENTS 8,737,276 B2 * 5/2014 Madan ................ H04W 72/042
370/280
8,885,509 B2 * 11/2014 Suzuki ................ H04W 76/28
370/252

(Continued)

OTHER PUBLICATIONS

3GPP, "LTE; Evolved Universal Terrestrial Radio Access Network (E-UTRAN); X2 Application Protocol (X2AP) (3GPP TS 36.423 version 11.6.0 Release 11)," European Telecommunications Standards Institute, ETSI TS 136 423, V11.6.0, Sep. 2013, pp. 1-144 (Total 45 pages).

(Continued)

*Primary Examiner* — Brian T O Connor
(74) *Attorney, Agent, or Firm* — Birch, Stewart, Kolasch & Birch, LLP (57) ABSTRACT

A method of receiving, by a first cell, an almost blank subframe (ABS) in a wireless communication system, and the first cell therefore are discussed. The method according to an embodiment includes receiving an ABS pattern information element from a second cell; and determining a sub frame which the second cell uses as the ABS, from the ABS pattern information element. The first cell determines the ABS pattern information element based on the downlink (DL) reference hybrid automatic repeat request (HARQ) timing of the second cell when the second cell uses an uplink subframe for downlink transmission.

13 Claims, 7 Drawing Sheets

(51) Int. Cl.
*H04L 1/18* (2006.01)
*H04W 72/08* (2009.01)
*H04W 72/04* (2009.01)
*H04W 92/20* (2009.01)
*H04W 52/38* (2009.01)
*H04W 84/04* (2009.01)

(52) U.S. Cl.
CPC ............ *H04W 16/10* (2013.01); *H04W 52/38* (2013.01); *H04W 72/0426* (2013.01); *H04W 72/0446* (2013.01); *H04W 72/082* (2013.01); *H04W 72/1289* (2013.01); *H04W 84/045* (2013.01); *H04W 92/20* (2013.01)

(58) Field of Classification Search
CPC ........... H04W 72/1289; H04W 72/082; H04W 72/0446; H04W 72/0426; H04L 1/1812; H04L 1/1861
See application file for complete search history.

(56) References Cited

U.S. PATENT DOCUMENTS

| | | | |
|---|---|---|---|
| 9,072,110 B2* | 6/2015 | Chen | H04W 76/10 |
| 9,078,255 B2* | 7/2015 | Pang | H04W 72/0426 |
| 9,345,023 B2* | 5/2016 | Gayde | H04W 72/0426 |
| 9,356,709 B2* | 5/2016 | Teyeb | H04W 72/0426 |
| 9,420,476 B2* | 8/2016 | Koutsimanis | H04J 11/005 |
| 9,497,756 B2* | 11/2016 | Dinan | H04W 72/0426 |
| 9,614,630 B2* | 4/2017 | Teyeb | H04W 52/243 |
| 9,680,581 B2* | 6/2017 | Song | H04L 5/00 |
| 9,768,942 B2* | 9/2017 | Golitschek Edler Von Elbwart | H04W 72/0446 |
| 9,986,501 B2* | 5/2018 | Feng | H04W 48/20 |
| 10,009,904 B2* | 6/2018 | Wang | H04W 72/1226 |
| 2012/0113843 A1 | 5/2012 | Watfa et al. | |
| 2013/0044704 A1 | 2/2013 | Pang et al. | |
| 2014/0206341 A1* | 7/2014 | Siomina | H04W 36/0088 455/422.1 |
| 2015/0029993 A1* | 1/2015 | Wu | H04W 72/1289 370/329 |
| 2015/0131553 A1* | 5/2015 | Centonza | H04W 24/10 370/329 |
| 2016/0242038 A1* | 8/2016 | Lei | H04W 16/10 |

OTHER PUBLICATIONS

Alcatel-Lucent, "Proporals for eIMTA Support on X2," 3GPP TSG-RAN WG2 Meeting #82, R3-132195, San Francisco, USA, Nov. 11-15, 2013, pp. 1-3.

Alcatel-Lucent, "Support for TDD Interference Mitigation and Traffic Adaptation (eIMTA)," Change Request, 3GPP TSG-RAN WG2 Meeting #82, R3-132196, San Francisco, USA, Nov. 11-15, 2013, 12 pages.

* cited by examiner

METHOD AND APPARATUS FOR RECEIVING ABS INFORMATION IN WIRELESS COMMUNICATION SYSTEM

CROSS REFERENCE TO RELATED APPLICATIONS

This application is the National Phase of PCT International Application No. PCT/KR2014/012529, filed on Dec. 18, 2014, which claims priority under 35 U.S.C. 119(e) to U.S. Provisional Application No. 61/917,909, filed on Dec. 18, 2013, all of which are hereby expressly incorporated by reference into the present application.

TECHNICAL FIELD

The following description relates to a wireless communication system, and more particularly, to a method and apparatus for receiving ABS information.

BACKGROUND ART

Wireless communication systems have been widely deployed to provide various types of communication services such as voice or data. In general, a wireless communication system is a multiple access system that supports communication between multiple users by sharing available system resources (e.g., bandwidth, transmission power and the like). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE OF THE INVENTION

Technical Task

The technical task of the present invention is to provide a configuration for how a cell interprets ABS (almost blank subframe) information when eIMTA (Enhanced Interference Management and Traffic Adaptation) and ABS are simultaneously applied.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of receiving ABS (almost blank subframe) information, which is received by a first cell in a wireless communication system, including the steps of receiving an ABS pattern information element from a second cell and determining a subframe used as an ABS by the second cell from the ABS pattern information element wherein if the second cell uses an uplink subframe for downlink transmission, the first cell estimates the ABS pattern information element with reference to a DL reference HARQ (hybrid automatic repeat request) timing of the second cell.

In a second technical aspect of the present invention, provided herein is a user equipment for performing D2D (device-to-device) resource measurement in a wireless communication system, including a receiving module and a processor, wherein the processor is configured to receive an ABS pattern information element from a second cell and determine a subframe used as an ABS by the second cell from the ABS pattern information element and wherein if the second cell uses an uplink subframe for downlink transmission, the first cell estimates the ABS pattern information element with reference to a DL reference HARQ (hybrid automatic repeat request) timing of the second cell.

Some or all of the following matters may be included in the first and second technical aspects of the present invention.

The DL reference HARQ timing may indicate a subframe for securing ACK/NACK transmission of user equipments belonging to the second cell.

The ABS pattern information element may include ABS pattern information.

The ABS pattern information may include a bitmap for indicating a subframe corresponding to the ABS.

If the DL reference HARQ timing corresponds to one of UL/DL configurations 1 to 5, the ABS pattern information may be interpreted in a unit of 20 bits.

If the DL reference HARQ timing corresponds to UL/DL configuration 6, the ABS pattern information may be interpreted in a unit of 60 bits.

If the DL reference HARQ timing corresponds to UL/DL configuration 0, the ABS pattern information may be interpreted in a unit of 70 bits.

A bit value of 1 in the bitmap may indicate the ABS.

The ABS pattern information element may be received through an X2 interface.

The first cell may receive information for indicating the DL reference HARQ timing from the second cell.

If the first cell is a victim cell, the first cell may transmit a downlink signal in the subframe determined as the ABS.

If the first cell is a victim cell, the first cell may instruct to perform measurement in the subframe determined as the ABS.

Advantageous Effects

According to the present invention, definite standards with respect to ABS interpretation and ABS signaling can be provided.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

Figure 1:
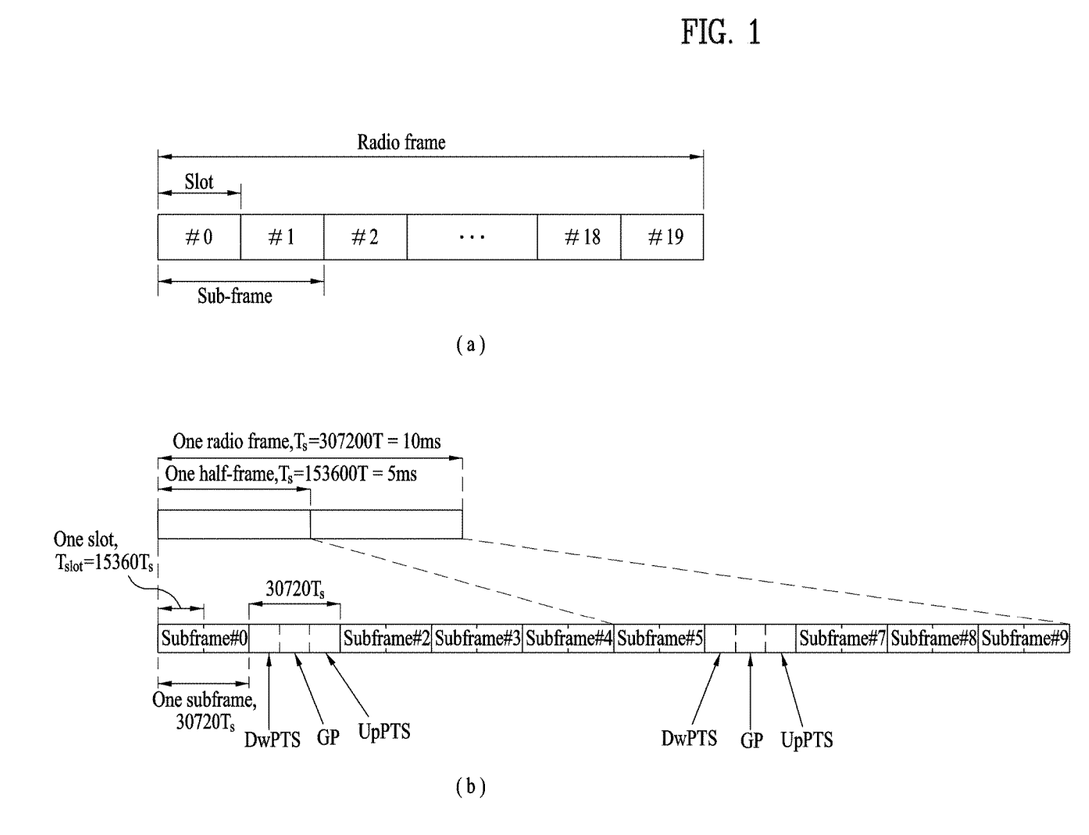
FIG. 1 is a diagram illustrating a structure of a radio frame.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
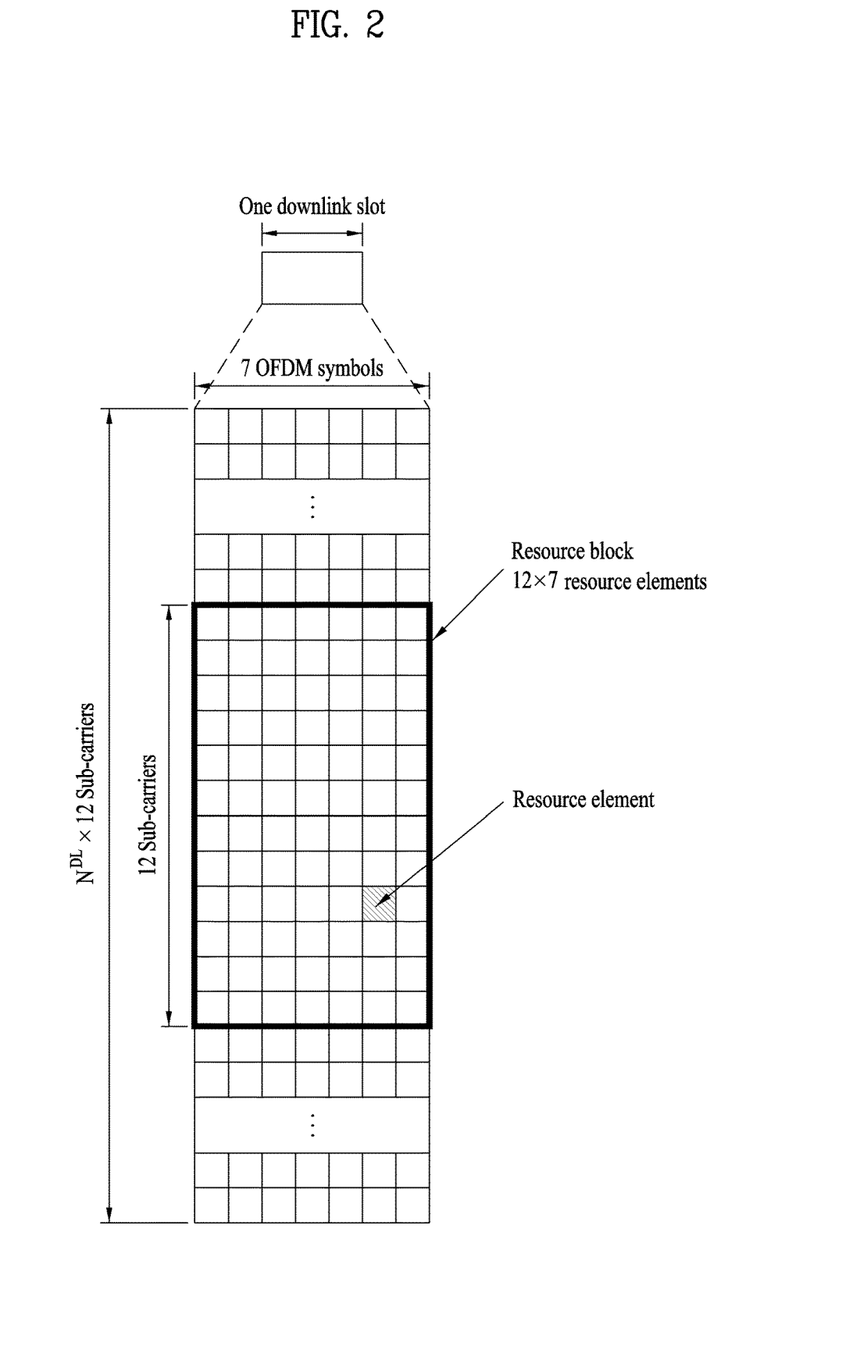
FIG. 2 is a diagram illustrating a resource grid for a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
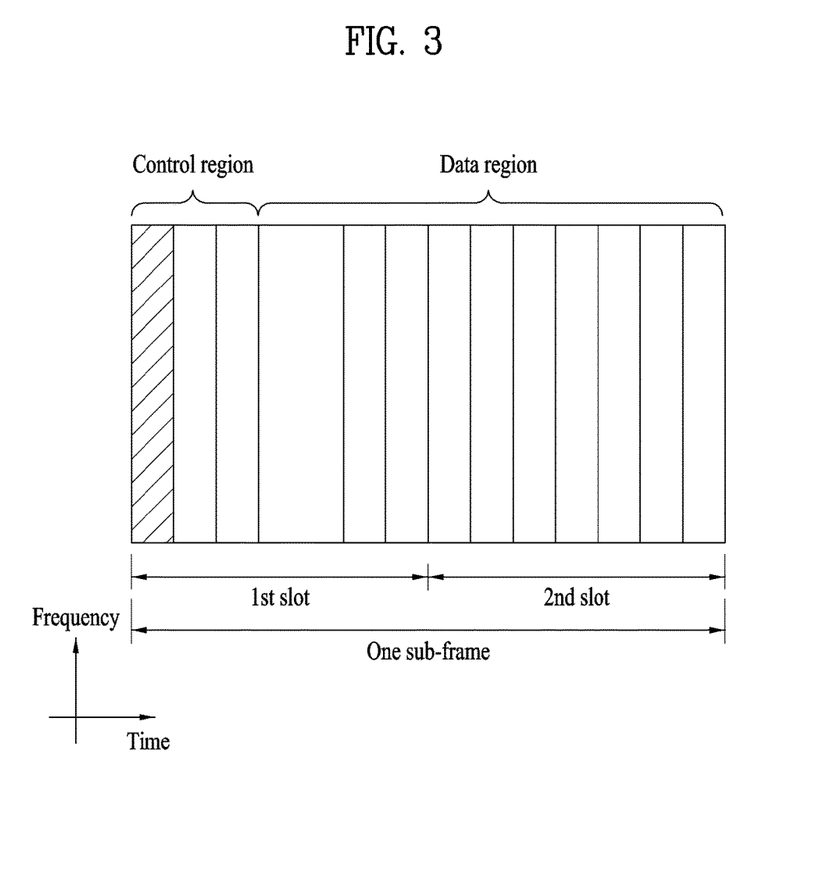
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
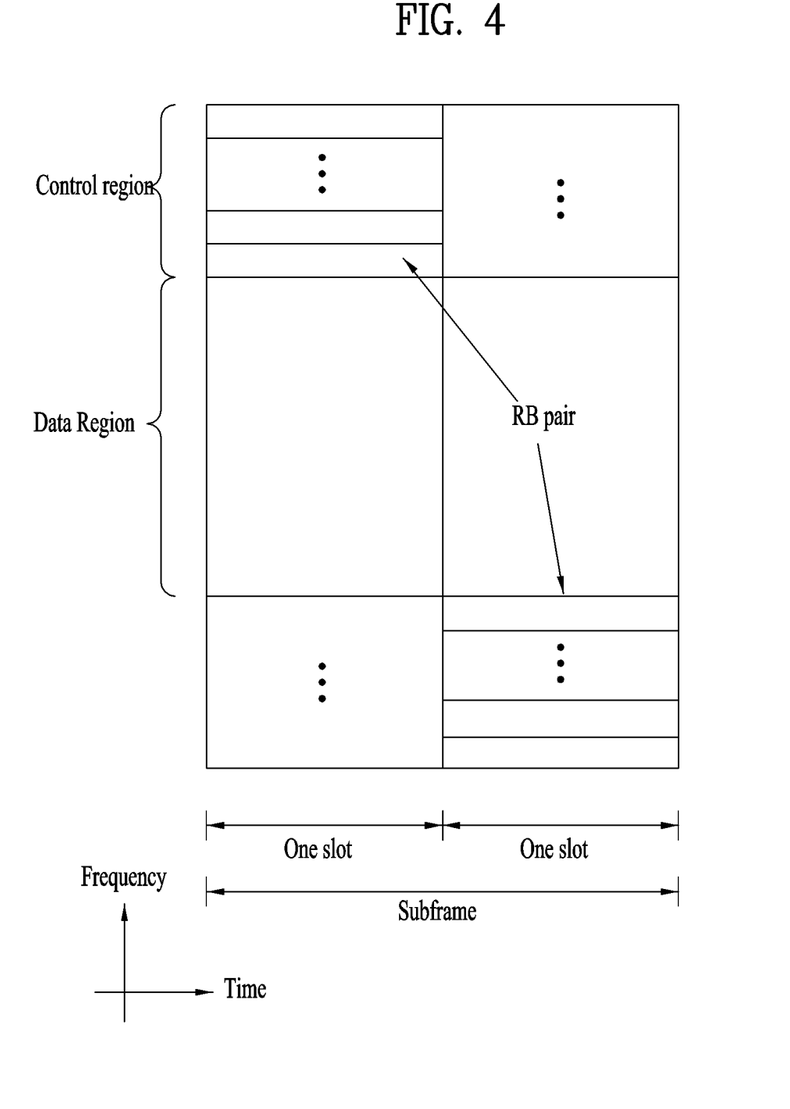
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

Figure 5:
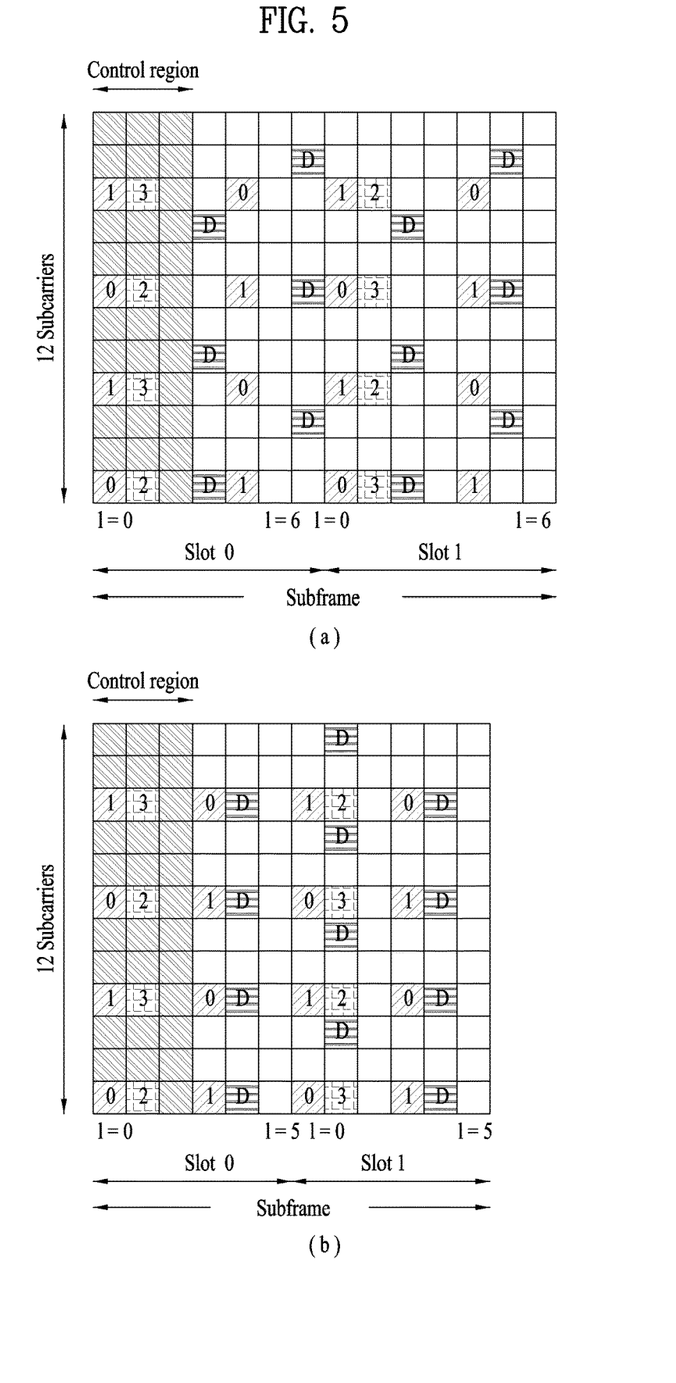
FIG. 5 is a diagram for describing a reference signal

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(a)) and 12 OFDM symbols in time in the case of the extended CP (see FIG. 5(b)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Inter-Cell Interference Coordination (ICIC)

As an example of ICIC for a frequency resource, the 3GPP LTE release-8 system divides a given whole frequency domain (e.g., system bandwidth) into one or more subdomains (e.g., physical resource block (PRB) units) and defines a method of exchanging an ICIC message for each of the frequency subdomains between cells. For instance, as information included in the ICIC message for the frequency resource, relative narrowband transmission power (RNTP) related to downlink transmit power is defined and UL IOI (interference overhead indication) and UL HII (high interference indication) related to uplink interference are defined in the 3GPP LTE release-8 system.

The RNTP corresponds to information indicating downlink transmit power used by a cell, which transmits an ICIC message, in a specific frequency subdomain. For instance, if an RNTP field for the specific frequency subdomain is set to a first value (e.g., 0), it may mean that the downlink transmit power of the corresponding cell does not exceed a prescribed threshold in the corresponding frequency subdomain. On the contrary, if the RNTP field for the specific frequency subdomain is set to a second value (e.g., 1), it may mean that the corresponding cell cannot promise the downlink transmit power in the corresponding frequency subdomain. In other word, if the value of the RNTP field corresponds to 0, the downlink transmit power of the corresponding cell can be considered to be low in the corresponding frequency subdomain. However, if the value of the RNTP field corresponds to 1, the downlink transmit power of the corresponding cell cannot be considered to be low in the corresponding frequency subdomain.

The UL IOI corresponds to information indicating the amount of uplink interference experienced (or received) by a cell, which transmits an ICIC message, in a specific frequency subdomain. For instance, if an IOI field for the specific frequency subdomain is set to a value corresponding to a large amount of interference, it may mean that the corresponding cell is experiencing strong uplink interference in the frequency subdomain. Meanwhile, if a cell receives the ICIC message, the cell can schedule a user equipment that uses low transmit power among the user equipments served by the cell in the frequency subdomain corresponding to the IOI indicating strong uplink interference. By doing so, since the user equipments perform uplink transmission with low transmit power in the frequency subdomain corresponding to the IOI indicating the strong uplink interference, uplink interference caused to the neighboring cell (i.e., the cell that transmits the ICIC message) can be reduced.

The UL HII corresponds to information indicating a degree of interference (or uplink interference sensitivity), which may occur in a corresponding frequency subdomain by uplink transmission of a cell that transmits an ICIC message. For instance, if an HII field for a specific frequency subdomain is set to a first value (e.g., 1), it may mean that the cell that transmits the ICIC message is likely to schedule user equipments having high uplink transmit power in the corresponding frequency subdomain. On the other hand, if an HII field for another specific frequency subdomain is set to a second value (e.g., 0), it may mean that the cell that transmits the ICIC message is likely to schedule user equipments having low uplink transmit power in the corresponding frequency subdomain. Meanwhile, if a cell receives the ICIC message, the cell first schedules user equipments in the frequency subdomain where the HII field is set to the second value (e.g., 0). Then, the cell schedules user equipments capable of well operating despite of strong interference in the frequency subdomain where the HII field is set to the first value (e.g., 1). By doing so, the cell can avoid interference from the cell that transmits the ICIC message.

As an example of ICIC for a time resource, the 3GPP LTE-A (or 3GPP LTE release-10) system divides a given whole time domain into one or more subdomains (e.g., subframe units) on frequency and defines a method of exchanging between cells whether silencing is performed for each of the time subdomains. A cell that transmits an ICIC message can deliver information indicating that silencing is performed on a specific subframe to neighboring cells and does not schedule PDSCH or PUSCH in the corresponding subframe. Meanwhile, a cell that receives the ICIC message can schedule uplink and/or downlink transmission for a user equipment in the subframe where the cell that transmits the ICIC message performs the silencing.

The silencing may mean that a specific cell almost does not perform signal transmission in a specific subframe in both uplink and downlink (or performs transmission with 0 or weak power). As an example of the silencing operation, the specific cell can configure the specific subframe as a multicast broadcast single frequency network (MBSFN) subframe. In case of a downlink subframe configured as the MBSFN subframe, a signal is transmitted in a control region only. In other words, a signal is not transmitted in a data region. As another example of the silencing operation, an interfering cell may configure a specific subframe as ABS (almost blank subframe) or an ABS-with-MBSFN. The ABS means a subframe configured to transmit only CRS in control and data regions of a downlink subframe and not to transmit other control information and data (or perform transmission with weak power only). However, downlink channels and downlink signals such as PBCH, PSS, SSS, etc. can be transmitted in the ABS. The ABS-with-MBSFN means a case that the CRS is not transmitted in the data region of the aforementioned ABS. The silencing can be performed in a unit of a specific subframe as described above and information indicating whether the silencing is performed may be referred to as a silent subframe pattern.

Regarding ABS, ABS-related signaling defined in the current 3GPP LTE-A standard is broadly classified into ABS information and ABS status. The ABS information is information for representing a subframe, which will be used as the ABS, on a bitmap. In FDD, the bitmap is composed of 40 bits. In TDD, the bitmap is composed of up to 70 bit although the number of bits for TDD varies depending on a DL-UL configuration. In the case of FDD, 40 bits represents 40 subframes. When a bit is set to 1, it indicates ABS. When a bit is set to 0, it indicates non-ABS. If restricted measurement is configured for a UE, the number of CRS antenna ports of a corresponding cell is reported for CRS measurement. A measurement subset is a subset of ABS pattern information and is also represented as a bitmap of 40 bits in FDD and a bitmap of up to 70 bits in TDD. Moreover, the measurement subset may be regarded as restricted measurement recommendation for configuring restricted measurement for a UE. Table 1 below shows ABS information elements defined in the LTE/LTE-A system.

TABLE 1

| IE/Group Name | Presence | Range | IE type and reference | Semantics description |
| --- | --- | --- | --- | --- |
| CHOICE ABS Information | M | — | — | |
| >FDD | | | — | — |
| >>ABS Pattern Info | M | | BIT STRING (SIZE(40)) | Each location in the bitmap represents a DL subframe. Value "1" indicates ABS and value "0" indicates non-ABS. In a radio frame where SFN = 0, the first position of the ABS pattern corresponds to subframe 0. The maximum number of subframes is 40. |
| >>Number Of Cell-specific Antenna Ports | M | | ENUMERATED (1, 2, 4, . . . ) | The number of antenna ports for a Pcell-specific reference signal. |
| >>Measurement Subset | M | | BIT STRING (SIZE(40)) | This indicates a subset of ABS pattern information and can be used to configure specific measurement for a UE. |
| >TDD | | | — | — |
| >>ABS Pattern Info | M | | BIT STRING (1 . . . 70, . . . ) | Each location in the bitmap represents a DL subframe. Value "1" indicates ABS and value "0" indicates non-ABS. The maximum number of subframes depends on a UL/DL subframe configuration. The maximum number of subframes is 20 for UL/DL subframe configurations 1 to 5, 60 for UL/DL subframe configuration 6, and 70 for UL/DL subframe configuration 0. The first position of the ABS pattern corresponds to subframe 0 in a radio frame where SFN = 0. The ABS pattern is continuously repeated in all radio frames and restarted at SFN = 0. |
| >>Number Of Cell-specific Antenna Ports | M | | ENUMERATED (1, 2, 4, . . . ) | The number of antenna ports for a Pcell-specific reference signal. |
| >>Measurement Subset | M | | BIT STRING (1 . . . 70, . . . ) | This indicates a subset of ABS pattern information and can be used to configure specific measurement for a UE. |
| >ABS Inactive | M | | NULL | This indicates interference coordination in the case of inactive ABS. |

Table 2 below shows ABS status information elements defined in the conventional LTE/LTE-A system. The purpose of use of the ABS status information elements is to assist an eNB to determine whether to changes the ABS pattern. In Table 2, 'Usable ABS Pattern Info' corresponds to bitmap information, which is a subset of ABS pattern information. And, 'Usable ABS Pattern Info' indicates whether a subframe configured as the ABS is appropriately used according to its original purpose. In addition, 'DL ABS status' corresponds to a percentage of the number of RBs allocated for a UE, which should be protected through the ABS, in the number of DL RBs scheduled in the subframe indicated through 'Usable ABS Pattern Info'. That is, 'DL ABS status' corresponds to information indicating how the ABS is efficiently utilized in a victim cell according to its original purpose.

TABLE 2

| IE/Group Name | Presence | Range | IE type and reference | Semantics description |
|---|---|---|---|---|
| DL ABS status | M | | INTEGER (0 ... 100) | This is a percentage with respect to ABS resources. The numerator of the percentage corresponds to the number of RBs in the ABS indicated by Usable ABS Pattern Info IE, which is allocated by eNB2. The denominator of the percentage corresponds to the total number of RBs in the ABS indicated by Usable ABS Pattern Info IE. |
| CHOICE Usable ABS Information | M | | — | — |
| >FDD | | | — | — |
| >>Usable ABS Pattern Info | M | | BIT STRING (SIZE(40)) | Each location in the bitmap represents a subframe. Value "1" indicates ABS and value "0" indicates all other subframes. A pattern expressed as the bitmap means a subset corresponding to ABS Pattern Info IE, which is transmitted through LOAD INFORMATION from the eNB. |
| >TDD | | | — | — |
| >>Usable ABS Pattern Info | M | | BIT STRING (1 ... 70) | Each location in the bitmap represents a subframe. Value "1" indicates ABS and value "0" indicates all other subframes. A pattern expressed as the bitmap means a subset corresponding to ABS Pattern Info IE, which is transmitted through LOAD INFORMATION from an eNB. |

A measurement subset configured with a subset of an ABS pattern corresponds to a subframe used as the ABS in a static manner. In case of other subframes included in the ABS pattern except the above subframe, a transmitting point may autonomously determine whether to utilize them as the ABS on the basis of traffic loads.

Enhanced Interference Management and Traffic Adaptation (eIMTA)

In the case of TDD, subframes (except for a special subframe for switching between uplink and downlink) are preconfigured to be used for either uplink or downlink. Specifically, referring to Table 3 below, for example, in the case of uplink-downlink configuration 0, subframe numbers 0 and 5 in one radio frame are preconfigured to be used for downlink and subframe numbers 2, 3, 4, 7, 8, and 9 in one radio frame are preconfigured to be used for uplink. An uplink-downlink configuration to be used by a specific eNB may be provided to a UE as a part of system information (e.g., SIB 1). In this case, neighboring eNBs may be forced to use the same TDD configuration, i.e., the same uplink-downlink configuration as that used by the specific eNB, for reasons of interference etc.

TABLE 3

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

(D: subframe for DL transmission, U: subframe for uplink transmission, S: special subframe)

Even in case that a system operates according to the UL-DL configuration as shown in Table 3, if the amount of data transmitted from each cell in UL or DL is significantly increased, usage of subframes may be changed for smooth transmission of data. In other words, one or more subframes configured as UL subframes may be changed to DL subframes or one or more subframes configured as DL subframes may be changed to UL subframes, conversely, whereby the system efficiency can be raised Switching from a UL subframe to a DL subframe may be performed in subframes bolded and enlarged in Table 4 below. Table 5 shows a case that a switching period is permitted to be changed. Moreover, when it is impossible to change the switching period, subframes that can be used as downlink subframes through switching are bolded and enlarged in Table 5.

TABLE 4

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 5

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Moreover, the switching from the UL subframe to the DL subframe may be performed when an existing TDD configuration is satisfied. In other words, if subframe usage is dynamically switched, a TDD uplink-downlink configuration after switching should be any one of the uplink-downlink configurations of Table 5. For example, if subframe number 4 in uplink-downlink configuration 0 is switched to a downlink subframe, subframe number 9 should also be switched to a downlink subframe. This has an advantage of indicating whether an uplink-downlink configuration is switched through one bit.

When the above-mentioned eIMTA is simultaneously applied together with the ABS, it is necessary to define a method of receiving an ABS signal. More particularly, the ABS information elements may be transceived between cells as described above. In this case, the ABS pattern information should be interpreted differently according to which UL/DL configuration is used. For example, if a cell that transmits the ABS information element uses one of UL/DL configurations 1 to 5, the ABS pattern information should be indicated/interpreted through/in a unit of 20 bits. In the case of UL/DL configuration 6, the ABS pattern information should be indicated/interpreted through/in a unit of 60 bits. When the eIMTA is applied, a cell that transmits the ABS configuration (hereinafter the cell is referred to as a second cell) may have a UL/DL configuration indicated by SIB (system information block), a UL/DL configuration that will be actually used due to the eIMTA, and a UL/DL configuration including DL reference HARQ timing for indicating a subframe for securing ACK/NACK transmission of user equipments belonging to the second cell. Thus, a cell that receives the ABS information element (hereinafter the cell is referred to as a first cell) can obtain correct ABS information only after knowing which UL/DL configuration or which time line the ABS information element transmitted by the second cell is based on. Therefore, it is defined which UL/DL configuration becomes the reference for ABS pattern signaling when the eIMTA and the ABS are simultaneously applied (i.e., when a configuration of the cell that signals the ABS pattern is dynamically changed).

Embodiment 1

First of all, the first cell that receives the ABS information element may interpret the ABS information element with reference to DL reference HARQ timing of the second cell that transmits the ABS information element. For instance, after receiving the ABS pattern information element from the second cell, the first cell may determine a subframe used as ABS by the second cell from the ABS pattern information element. In this case, the second cell uses an uplink subframe for downlink transmission (i.e., the eIMTA is applied to the second cell), the first cell may estimate the ABS pattern information element with reference to the DL reference HARQ timing of the second cell. Here, the DL reference HARQ timing may indicate the subframe for securing the ACK/NACK transmission of the user equipments belonging to the second cell as described above (this may be indicated in the form of the UL-DL configuration defined in the LTE/LTE-A). Alternatively, the DL reference HARQ timing may be a DL-reference UL/DL configuration defined in the conventional LTE/LTE-A.

As mentioned in the foregoing description, the ABS pattern information element includes ABS pattern information, which is the bitmap for indicating a subframes corresponding to ABS. Based on this ABS pattern information, the first cell may determine which subframe is used as the ABS by the second cell. In particular, the second cell may interpret the ABS pattern information i) in a unit of 20 bits when the DL reference HARQ timing is one of UL/DL configurations 1 to 5 ii) in a unit of 60 bits when the DL reference HARQ timing is UL/DL configuration 6, or iii) in a unit of 70 bits when the DL reference HARQ timing is UL/DL configuration 0. The first cell may determine a subframe corresponding to a bit value of 1 in the bitmap having the unit length, which is determined as described above, as the ABS used by the second cell.

In this case, the UL/DL configuration may be informed neighboring cells through X2 signaling or the like in the form as shown in Table 6. In Table 6, subframe assignment information corresponds to the UL/DL configuration transmitted through the SIB 1 and TS 36.xxx means 3GPP LTE specifications.

TABLE 6

| >>TDD Info | | | |
|---|---|---|---|
| >>>EARFCN | M | | Corresponds to NDL/NUL in ref. TS 36.104 |
| >>>Transmission Bandwidth | M | Transmission Bandwidth | |
| >>>Subframe Assignment | M | ENUMERATED(sa0, sa1, sa2, sa3, sa4, sa5, sa6, . . . ) | Uplink-downlink subframe configuration information defined in ref. TS 36.211 |
| >>>Special Subframe Info | 1 | | Special subframe configuration information defined in ref. TS 36.211 |

Figure 6:
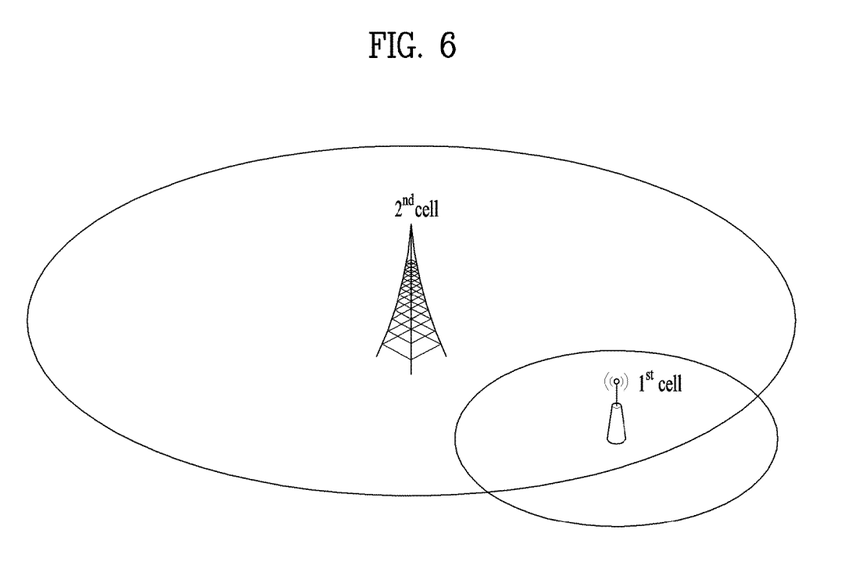
FIG. 6 illustrates an example of a communication environment to which embodiments of the present invention are applied.

If the first cell and the second cell in the above description correspond to a victim cell and an aggressor cell, respectively, the first cell may perform scheduling, measurement and the like after obtaining ABS related information of the second cell. In detail, if determining the subframe as the ABS with reference to the DL reference HARQ timing of the second cell, the first cell, i.e., the victim cell, may transmit a downlink signal or allow uplink transmission only in the corresponding subframe since in the situation as shown in FIG. 6, it is very difficult for user equipments belonging to the first cell to correctly receive downlink signals in a subframe not configured as the ABS by the second cell due to strong interference. As another example, the first cell may instruct user equipments included in its coverage to perform measurement in the subframe determined as the ABS. The reason for this is that if the user equipments belonging to the first cell perform the measurement on a subframe not configured as the ABS by the second cell, it is difficult to perform the measurement correctly due to a strong signal from the second cell.

In addition, the first cell may assume/consider a UL reference HARQ timing (of the second cell) (which is transmitted by the second cell) as a UL/DL configuration on SIB 1. In other words, the first cell may estimate the UL reference HARQ timing with reference to the UL/DL configuration indicated by the SIB and an ABS pattern and/or ABS pattern length with reference to the DL reference HARQ timing. For such a configuration, the second cell may deliver the DL reference HARQ timing to the first cell. In this case, the second cell may deliver the DL reference HARQ timing through an ABS X2 interface similar to the ABS pattern information element. Alternatively, the first cell may receive the DL reference HARQ timing and/or the ABS pattern information element through overhearing.

Embodiment 2

According to the second embodiment, when an ABS pattern are transceived between two cells, the ABS pattern and a ABS pattern length may be determined by a UL/DL configuration indicated by SIB 1 of the cell that transmits the ABS pattern information element, i.e., the second cell.

More particularly, the second cell may broadcast the UL/DL configuration to user equipments in the corresponding cell through the SIB 1. Even when the eIMTA is applied to the second cell, the cell may perform the same broadcasting to guarantee operations of legacy user equipments.

When the cell that signals the ABS pattern dynamically changes the UL/DL configuration, both of the cell that transmits the ABS pattern and the cell that receives the ABS pattern may adopt the following assumptions. Moreover, the following assumptions can be equally applied to other embodiments.

The cells can assume that low interference is always guaranteed in ABS indicated by the corresponding ABS pattern regardless of transmission direction (of the actual configuration). This may mean that the ABS is also applied to UL subframes.

Alternatively, the cells can assume that the ABS pattern is applied only to DL subframes of the actual configuration (i.e. dynamically changed configuration) of the cell that signals the corresponding ABS pattern. For instance, if SF defined as UL SF in the configuration of the SIB 1 is changed to DL SF due to a reconfiguration and the corresponding SF is designated as ABS in the ABS pattern (i.e., when the eIMTA is applied, flexible DL SF is set to '1' in the ABS pattern), the corresponding SF can be assumed to be the ABS.

Embodiment 3

As a further embodiment, the first cell may use an intended configuration when interpreting the ABS information. Here, the intended configuration may mean a UL/DL configuration that is highly likely to be changed/used by a cell performing the eIMTA operation.

Particularly, the cell that signals the ABS pattern (i.e., second cell) may signal the intended configuration to neighboring cells and the neighboring cells (including the first cell) may use the intended configuration, whereby the ABS pattern and/or the ABS pattern length can be changed. When the intended configuration is signaled, the ABS pattern related information also needs to be signaled.

According to the third embodiment, it has an advantage in that an HARQ timing can be dynamically changed. Moreover, since the ABS pattern can be designated with reference to a UL/DL configuration with more downlink subframes rather than a UL/DL configuration through SIB, it has a high degree of freedom in ABS subframe selection.

Device Configuration According to Embodiments of the Present Invention

Figure 7:
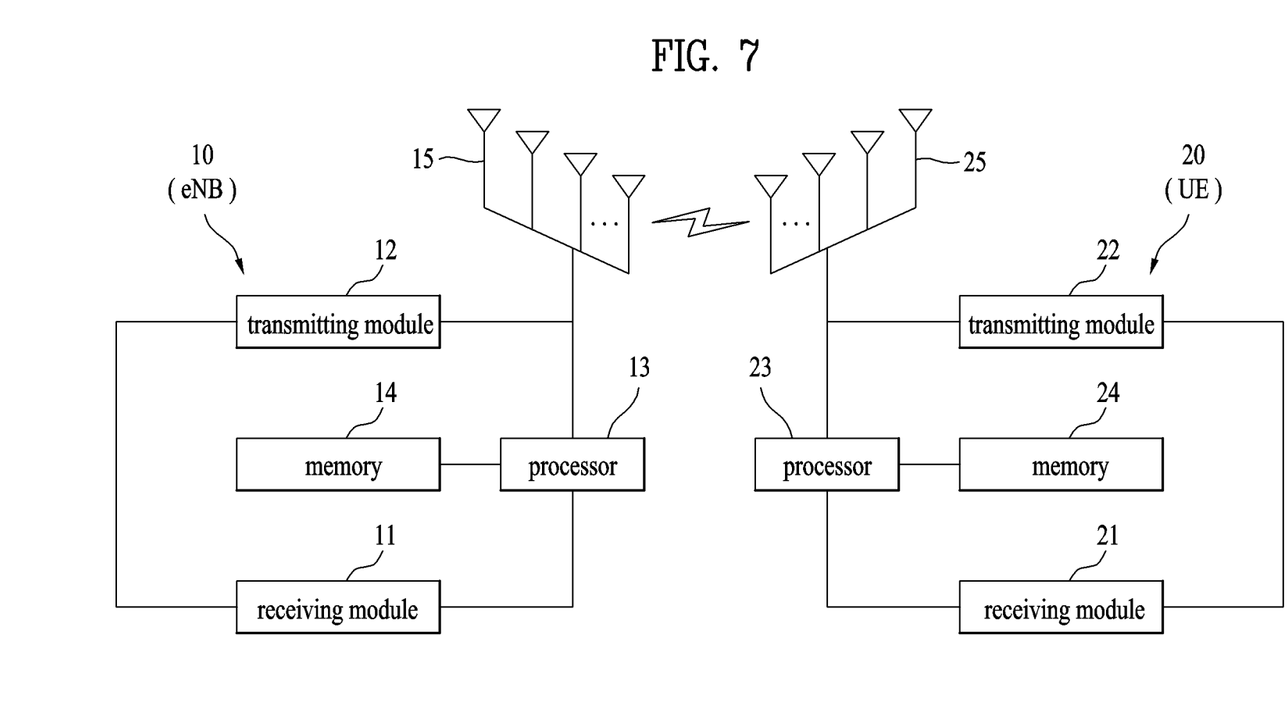
FIG. 7 is a diagram illustrating configurations of transmitting and receiving devices.

FIG. 7 is a diagram illustrating configurations of a transmission point device and a user equipment device according to embodiments of the present invention.

Referring to FIG. 7, a transmission point device 10 according to the present invention may include a receiving module 11, a transmitting module 12, a processor 13, a memory 14 and a plurality of antennas 15. The plurality of the antennas 15 may mean that the transmission point device supports MIMO transmission and reception. The receiving module 11 can receive various signals, data and information in uplink from a user equipment. The transmitting module 12 can transmit various signals, data and information in downlink to the user equipment. And, the processor 13 can control overall operations of the transmission point device 10.

The processor 13 of the transmission point device 10 according to one embodiment of the present invention can handle the details required in each of the embodiments mentioned in the foregoing description.

The processor 13 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 7, a user equipment device 20 according to the present invention may include a receiving module 21, a transmitting module 22, a processor 23, a memory 24 and a plurality of antennas 25. The plurality of the antennas 15 may mean that the transmission point device supports MIMO transmission and reception. The receiving module 21 can receive various signals, data and information in downlink from an eNB. The transmitting module 22 can transmit various signals, data and information in uplink to the eNB. And, the processor 23 can control overall operations of the user equipment device 20.

The processor 23 of the user equipment device 20 according to one embodiment of the present invention can handle the details required in each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The detailed configurations of the transmission point device 10 and the user equipment device 20 can be implemented such that the details explained with reference to various embodiments of the present invention are independently applied or two or more embodiments of the present invention are simultaneously applied. And, redundant description shall be omitted for clarity.

The description of the transmission point device 10 in FIG. 7 may be equally applied to a relay node device as a downlink transmission entity or an uplink reception entity. And, the description of the user equipment device 20 in FIG. 7 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The above-described embodiments of the present invention can be applied to various kinds of mobile communication systems.

What is claimed is:

1. A method of receiving almost blank subframe (ABS) information by a first cell from a second cell in a wireless communication system, the method comprising:
  receiving an ABS pattern information element from the second cell; and
  determining a subframe used as an ABS by the second cell from the ABS pattern information element,
  wherein when the second cell is a cell to which enhanced interference management and traffic adaptation (eIMTA) is not applied, the first cell estimates the ABS pattern information element with reference to downlink (DL) subframes of an uplink/downlink (UL/DL) configuration on a system information block 1 (SIB1) of the second cell, and wherein when the second cell is a cell to which the eIMTA is applied, the first cell estimates the ABS pattern information element with reference to DL subframes of a DL reference hybrid automatic repeat request (HARQ) UL/DL configuration of the second cell among the DL reference HARQ UL/DL configuration of the second cell and the UL/DL configuration on the SIB1 of the second cell.

2. The method of claim 1, wherein the DL reference HARQ UL/DL configuration indicates a subframe for securing acknowledgement/negative acknowledgement (ACK/NACK) transmission of user equipments belonging to the second cell.

3. The method of claim 1, wherein the ABS pattern information element comprises ABS pattern information.

4. The method of claim 1, wherein ABS pattern information comprises a bitmap for indicating a subframe corresponding to the ABS.

5. The method of claim 4, wherein if the DL reference HARQ UL/DL configuration corresponds to one of UL/DL configurations 1 to 5, the ABS pattern information is interpreted in a unit of 20 bits.

6. The method of claim 4, wherein if the DL reference HARQ UL/DL configuration corresponds to UL/DL configuration 6, the ABS pattern information is interpreted in a unit of 60 bits.

7. The method of claim 4, wherein if the DL reference HARQ UL/DL configuration corresponds to UL/DL configuration 0, the ABS pattern information is interpreted in a unit of 70 bits.

8. The method of claim 4, wherein a bit value of 1 in the bitmap indicates the ABS.

9. The method of claim 1, wherein the ABS pattern information element is received through an X2 interface.

10. The method of claim 1, wherein the first cell receives information for indicating the DL reference HARQ UL/DL configuration from the second cell.

11. The method of claim 1, wherein if the first cell is a victim cell, the first cell transmits a downlink signal in the subframe determined as the ABS.

12. The method of claim 1, wherein if the first cell is a victim cell, the first cell instructs to perform measurement in the subframe determined as the ABS.

13. A first cell for receiving almost blank subframe (ABS) information from a second cell in a wireless communication system, the first cell comprising:
    a receiver; and
    a processor configured to:
        control the receiver to receive an ABS pattern information element from the second cell,
        and
        determine a subframe used as an ABS by the second cell from the ABS pattern information element,
    wherein when the second cell is a cell to which enhanced interference management and traffic adaptation (eIMTA) is not applied, the first cell estimates the ABS pattern information element with reference to downlink (DL) subframes of an uplink/downlink (UL/DL) configuration on a system information block 1 (SIB1) of the second cell, and
    wherein when the second cell is a cell to which the eIMTA is applied, the first cell estimates the ABS pattern information element with reference to DL subframes of a DL reference hybrid automatic repeat request (HARQ) UL/DL configuration of the second cell among the DL reference HARQ UL/DL configuration of the second cell and the UL/DL configuration on the SIB 1 of the second cell.

* * * * *